| United States Patent [19] | [11] | 4,152,499 |
|---|---|---|
| Boerzel et al. | [45] | May 1, 1979 |

[54] POLYISOBUTENES

[75] Inventors: Paul Boerzel, Frankenthal; Klaus Bronstert, Carlsberg; Friedrich Hovemann, Hockenheim, all of Fed. Rep. of Germany

[73] Assignee: BASF Aktiengesellschaft, Fed. Rep. of Germany

[21] Appl. No.: 863,914

[22] Filed: Dec. 23, 1977

[30] Foreign Application Priority Data

Jan. 22, 1977 [DE] Fed. Rep. of Germany ....... 2702604

[51] Int. Cl.² .................... C08F 4/14; C08F 110/10; C08F 8/46
[52] U.S. Cl. .................... 526/52.4; 252/51.5 A; 526/237; 526/272; 526/348.7; 585/18; 585/525
[58] Field of Search ............... 260/683.15 B; 526/237, 526/272, 348.7, 52.4

[56] References Cited

U.S. PATENT DOCUMENTS

| 2,559,984 | 7/1951 | Montgomery et al. ..... 260/683.15 B |
| 2,918,508 | 12/1959 | Coopersmith et al. ..... 260/683.15 B |
| 3,634,383 | 1/1972 | Miller, Jr. .......................... 526/348.7 |
| 3,726,842 | 4/1973 | Trieschmann et al. ........... 526/348.7 |
| 3,778,487 | 12/1973 | Driscoll et al. ............. 260/683.15 B |

*Primary Examiner*—Alan Holler
*Attorney, Agent, or Firm*—Keil & Witherspoon

[57] ABSTRACT

Isobutene polymers having a mean degree of polymerization P of from 10 to 100 and a proportion E of double bonds, capable of reaction with maleic anhydride, of from 60 to 90%, where E=100% corresponds to the calculated theoretical value for the case where each molecule of the isobutene polymer contains such a reactive double bond.

6 Claims, No Drawings

POLYISOBUTENES

The present invention relates to new isobutene polymers and to a process for their manufacture.

The polymerization of isobutene by means of various initiators, including boron trifluoride, has been disclosed, for example in "High Polymers", volume XXIV (H. Wiley & Sons, Inc. New York, 1971), pages 713 et seq. Depending on the conventional polymerization technique employed, products having different mean degrees of polymerization P are obtained, and amongst these, polymers where P is from 10 to 100 are of particular importance as intermediates for crude oil additives. If these polyisobutenes (which should more correctly be described as oligoisobutenes, though this term is less usual in the literature) are reacted with maleic anhydride, adducts are formed which, on reaction with amines, give valuable lubricating oil additives.

However, this adduct formation virtually only occurs between the maleic anhydride and a terminal double bond in the polyisobutene, which double bond is the result of the chain-stopping reaction. Double bonds in the β-position are also still capable of reacting, to a certain degree, with maleic anhydride, whilst with double bonds further removed from the chain ends virtually no reaction occurs. If the proportion of reactive, predominantly terminal, double bonds in the isobutene polymer is designated E, the relative activity W of the lubricating oil additives would be 100% if all the theoretically possible double bonds were terminal, i.e. if E was also 100%. However, this is impractical as the values achieved are merely E=W=from 20 to 50%. Accordingly, larger amounts of such anisobutene polymer/maleic anhydride reaction product have to be employed than would be the case theoretically if E was 100%. The isobutene polymer which has not reacted with maleic anhydride and is present in the lubricating oil additive at best behaves inertly toward the oil; if substantial amounts are present, they even have to be removed.

This is evidently a disadvantage and accordingly it is the object of the present invention to provide isobutene polymers, having a degree of polymerization P of from 10 to 100, where the proportion E of theoretically possible terminal double bonds is greater than in the conventional products.

We have found that this object is achieved and that isobutene polymers having a degree of polymerization P of from 10 to 100 and a higher proportion of reactive double bonds than in conventional products are obtained by polymerizing isobutene with boron trifluoride as the initiator, if the polymerization is carried out at from −50° to +30° C., from 1 to 20 mmoles of boron trifluoride are used per mole of isobutene and the mean polymerization time is confined to from 1 to 10 minutes.

This process is based on the discovery that boron trifluoride, used as the polymerization initiator, on the one hand mainly favors the formation of the α-olefin structure in the isobutene polymers, but on the other hand also favors isomerization to give polymers with a non-terminal double bond. By adhering to the specified short polymerization time, which is preferably from 3 to 5 minutes, and which in turn is made possible by the specified higher-than-usual initiator concentration, the isomerizing effect of the boron trifluoride is substantially suppressed.

The polymerization can also be accelerated by the conventional method used for cationic polymerization, i.e. by using co-catalysts, e.g. water or alcohols. The amount of such compounds is usually from 0.2 to at most 1.0 mole %, based on the amount of the boron trifluoride.

In every case, the polymerization as such may be carried out by introducing gaseous boron trifluoride, with or without addition of the co-catalyst, batchwise, semi-continuously or completely continuously, in the conventional manner, into isobutene cooled to from −50° to +30° C., whilst cooling the mixture efficiently and mixing it thoroughly. The polymerization may then be stopped, again in the conventional manner, by adding alcohols, e.g. methanol, or aqueous or alcoholic alkali metal hydroxide solutions. The catalyst residues may then be filtered off or adsorbed on adsorbents, e.g. aluminum oxide, or extracted with water or alcohol. Solvents, monomers and low molecular weight oligomers are advantageously removed by flash distillation.

As is always the case with such polymerizations, polymers having a certain spectrum of degrees of polymerization are obtained. However, the scatter in the degree of polymerization has no discernible effect on the properties of the aminated isobutene polymer/maleic anhydride adducts, and only the mean degree of polymerization P matters; the latter can even be determined continuously, for example by viscosity measurements, and controlled continuously, during the polymerization. Within the specified range, polymers where P is from 15 to 40 are preferred.

For the purposes of the invention, isobutene polymers means not only isobutene homopolymers, but also copolymers containing at least 80% of isobutene units. Suitable comonomers are primarily the other olefinically unsaturated hydrocarbons of 4 carbon atoms, so that—as is industrially of particular importance—C$_4$-cuts may be used directly as starting materials. Such cuts contain from 12 to 14% of butanes, from 40 to 55% of butenes and up to 1% of butadiene, and, it is true, only from 35 to 45% of isobutene, but the substantially selective polymerizability of the isobutene ensures that under the polymerization conditions the other monomers are only incorporated into the resulting polymer to the extent of from about 2 to 20%. The monomers which have not reacted can be used for other purposes.

Using the process according to the invention, isobutene polymers having a proportion E of double bonds, capable of reacting with maleic acid or maleic anhydride, of from 60 to 90 percent are obtained. The calculated theoretical value of E=100% would correspond to each isobutene polymer molecule containing such a reactive double bond. E can be determined simply, and in the most reliable manner, directly from the acid number of the isobutene polymer/maleic anhydride adduct.

To manufacture the petroleum additive, the isobutene polymer is reacted with the stoichiometric amount of maleic anhydride, or a slight excess thereof, in the conventional manner at from 170° to 250° C.

These adducts, in turn, are converted in the conventional manner into the lubricating oil additives by reacting them with amines, above all polyamines of the general formula

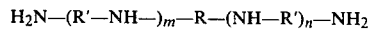

$$H_2N-(R'-NH-)_m-R-(NH-R')_n-NH_2$$

where R and R' are alkylene of 2 to 4 carbon atoms and m and n are from 1 to 5. Examples of such polyamines are diethylenetriamine and triethylenetetramine.

The petroleum additives obtainable from the isobutene polymers according to the invention are distinguished by an increased activity W, attributable to the increase in the proportion E of reactive double bonds. The values of W are most simple determined by the spot method of A. Schilling, "Motor Oils and Engine Lubrication", volume 1, page 254, Scientific Publications, Ltd., 1968, in which method the dispersing power of the additives for carbon black in lubricating oils is measured. The improvements in activity achievable by using the isobutene polymers according to the invention are, according to this method and keeping all other parameters constant, from about 5 to 15 percent. Comparative compositions have values of W of from 43 to 53%, whilst those based on the new isobutene polymers give values of from 50 to 62%.

EXAMPLE 1

Using a continuous polymerization apparatus, 12 kg per hour of a $C_4$-cut composed of 39% of isobutene, 23% of but-1-ene, 8% of cis-but-2-ene, 12% of trans-but-2-ene, 1% of butadiene and 17% of butanes were polymerized with 8 g/h (=1.5 mmoles/h/mole of isobutene) of $BF_3$ at 20° C. and 2.3 bars with vigorous stirring and efficient cooling. The mean residence time was 3 minutes. The polymerization was then stopped by means of 3 g of methanol/kg of reaction mixture, after which the residual gases, the methanol and the low oligomers were removed by distillation. The yield of polymer, having a mean degree of polymerization of 16, was 4.1 kg and the proportion of isobutene therein was 94%.

Reaction with maleic anhydride (for details, see Example 3) and determination of the acid number of the adduct indicated a proportion E of reactive, predominantly terminal double bonds of 88% of the theoretical value (=100%) which would apply if all molecules of the polymer had a double bond capable of reacting with maleic anhydride.

EXAMPLE 2

Using the method described in Example 1, but at from −10° to −5° C. and 2.5 bars, with a polymerization time of 2 minutes, 500 g of isobutene were reacted with 6 mmoles of $BF_3$/mole of isobutene to give 285 g of isobutene polymer having a mean degree of polymerization of 31. The proportion E of the reactive double bonds was 79%.

EXAMPLE 3

100 g portions of the isobutene polymers manufactured as described in Examples 1 and 2 and two commercial isobutene polymers A and B were heated with 20 g of maleic anhydride for 4 hours at 200° C., whilst stirring. After removing the excess maleic anhydride under greatly reduced pressure the acid numbers of the adducts were determined in the conventional manner. From the degrees of polymerization P and the acid numbers, the proportion E of the reactive double bonds capable of reacting with maleic anhydride was calculated.

The adducts were then reacted at 120° C. with a slight excess of N-(2-aminoethyl)-propylene-1,3-diamine, after which the excess amine was also distilled off. The structure of these reaction products, which can contain both amide and imide groups comprising straight-chain or cyclic radicals, was not determined, since it is of secondary importance with regard to the technological properties of the adducts.

To determine their suitability for use as lubricating oil additives, the aminated polyisobutene/maleic anhydride adducts were examined by the spot test, using the method described above.

The Table which follows shows that the polyisobutenes according to the invention result in a substantially greater activity of the additives than do the conventional polyisobutenes.

| Isobutene polymer | Degree of polymerization P | Acid number of the maleic anhydride adduct | Proportion E of double bonds which can react with maleic anhydride | Activity determined by the spot test, in % |
|---|---|---|---|---|
| According to Example 1 | 14 | 55 | 88 | 62% |
| According to Example 2 | 31 | 24 | 79 | 56% |
| Commercial product A | 15 | 16 | 28 | 43% |
| Commercial product B | 22 | 28 | 66 | 43% |

We claim:

1. An isobutene polymer having a mean degree of polymerization P of from 10 to 100, wherein the proportion E of double bonds capable of reacting with maleic anhydride is from 60 to 90%, E=100% corresponding to the calculated theoretical value for the case where each molecule of the isobutene polymer contains such a reactive double bond.

2. An isobutene polymer as set forth in claim 1, wherein up to 20% by weight of monomers of 4 carbon atoms other than isobutene are present as copolymerized units.

3. A process for the manufacture of the isobutene polymer as set forth in claim 1 by polymerizing isobutene by means of boron trifluoride as the initiator, wherein the polymerization is carried out at from −50° to +30° C., from 1 to 20 mmoles of boron trifluoride are used per mole of isobutene and the mean polymerization time is confined to from 1 to 10 minutes.

4. A process as set forth in claim 3, wherein water or alcohol is employed as a co-catalyst for cationic polymerization together with boron trifluoride, said co-catalyst being used in an amount from 0.2 to 1.0 mole%, based on the amount of boron trifluoride.

5. A process as set forth in claim 3, wherein a $C_4$-cut containing at least 35% by weight of isobutene is employed.

6. Petroleum additives which are manufactured by reacting the isobutene polymers set forth in claim 1 at 170° to 250° C. with a stoichiometric or slight excess amount of maleic anhydride and then reacting the resulting reaction product with a slight molar excess of an amine of the formula

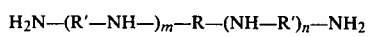

where R and R' are alkylene of 2 to 4 carbon atoms and m and n are integers from 1 to 5.

* * * * *